United States Patent [19]

Baldwin et al.

[11] Patent Number: 5,276,630
[45] Date of Patent: Jan. 4, 1994

[54] SELF CONFIGURING CONTROLLER

[75] Inventors: Joe M. Baldwin; Richard A. Bishop; William G. Hansen; Phillip L. Polley, all of Clarksville, Tenn.

[73] Assignee: American Standard Inc., New York, N.Y.

[21] Appl. No.: 557,253

[22] Filed: Jul. 23, 1990

[51] Int. Cl.$^5$ .............................. G06F 15/20
[52] U.S. Cl. .................... 364/505; 364/151; 364/186; 364/187; 62/126
[58] Field of Search ............ 364/505, 557, 551.01, 364/571.01, 184, 200, 900, 148, 186, 187, 150, 151; 165/22; 62/126; 417/8, 38; 340/825.16; 324/503

[56] References Cited

U.S. PATENT DOCUMENTS

| 3,555,251 | 1/1971 | Shavit | 364/148 |
|---|---|---|---|
| 3,593,307 | 7/1971 | Gouge, Jr. | 364/186 |
| 4,151,723 | 5/1979 | Gardner | 364/505 |
| 4,209,994 | 7/1980 | Mueller et al. | 364/505 |
| 4,214,300 | 7/1980 | Barlow et al. | 364/152 |
| 4,275,439 | 6/1981 | Kuwata | 364/152 |
| 4,276,925 | 7/1981 | Palmieri | 364/505 |
| 4,325,223 | 4/1982 | Canney | 364/551.01 |
| 4,333,316 | 6/1982 | Stamp, Jr. et al. | 62/126 |
| 4,335,847 | 6/1982 | Levine | 364/505 |
| 4,381,549 | 4/1983 | Stamp, Jr. et al. | 364/557 |
| 4,395,887 | 8/1983 | Sweetman | 364/505 |
| 4,411,139 | 10/1983 | Bos | 364/505 |
| 4,432,210 | 2/1984 | Saito | 62/126 |
| 4,487,028 | 12/1984 | Foye | 165/22 |
| 4,502,842 | 3/1985 | Currier et al. | 364/558 |
| 4,535,598 | 8/1985 | Mount | 62/126 |
| 4,545,210 | 10/1985 | Lord | 62/77 |
| 4,573,326 | 3/1986 | Sulfstede et al. | 62/156 |
| 4,580,947 | 4/1986 | Shibata et al. | 417/8 |
| 4,598,355 | 7/1986 | Shepler et al. | 364/184 |
| 4,660,386 | 4/1987 | Hansen et al. | 364/185 |
| 4,682,279 | 7/1987 | Watabe | 364/141 |
| 4,682,648 | 7/1987 | Fried | 165/22 |
| 4,819,441 | 3/1989 | Hanson | 62/126 |
| 4,843,084 | 6/1989 | Parker et al. | 364/505 |
| 4,857,918 | 8/1989 | Nukushina et al. | 340/870.16 |
| 4,897,798 | 1/1990 | Cler | 364/148 |
| 4,947,355 | 8/1990 | Koeman | 364/579 |
| 5,008,803 | 4/1991 | Iida | 364/148 |

Primary Examiner—Jack B. Harvey
Assistant Examiner—Ellis B. Ramirez
Attorney, Agent, or Firm—William J. Beres; William O'Driscoll; Peter D. Ferguson

[57] ABSTRACT

A method of operating a controller of an HVAC system comprising the steps of: constantly establishing the validity of each of a plurality of input devices; and reconfiguring the mode of operation of the HVAC system each time the validity of any of the plurality of input devices changes to ensure that the HVAC system operates in the best available mode of operation.

31 Claims, 7 Drawing Sheets

COMPRESSOR

SELF CONFIGURING CONTROLLER

BACKGROUND OF THE INVENTION

The present invention is directed to a self-configuring controller for a heating, ventilating and air conditioning system (HVAC system) and, more particularly, to a method and apparatus for accurately, automatically, and continually configuring the controller of the HVAC system to select the optimal operating mode for the current system configuration.

Large scale HVAC systems are tailored to the owner's specific needs and requirements. An HVAC system will typically include one or more compressors, one or more condensers, one or more evaporators, and one or more condenser fans, all of which are controlled by a controller. The HVAC system can also include an economizer, heat pump operation, a building automation system, and a heating system. The controller is generally provided to monitor and control the operation of the system as configured by the owner of the HVAC system.

Many problems which are found in prior systems result from human error in programming or identifying the system configuration to the controller. Other problems occur because the system configuration changes due to component failure or recovery, or to modification of the system by the owner.

Prior art systems have relied on configuration jumpers and DIP switches to initially inform the controller of the system's configuration. Configuration jumpers are a series of paired input terminals which are individually connected or disconnected by an installer to inform the controller of the presence or absence of particular system elements or functions. Similarly, a DIP (dual in-line package) switch is a bank of small switches adapted for easy insertion into a printed circuit board. The individual switches of the DIP switch are opened or closed by an installer to provide an input to the controller representative of the presence or absence of particular system functions or elements. However, both configuration jumpers and DIP switches are subject to installer error during the initial system configuration, and both are subject to accidental alteration once the system has been established. Additionally, DIP switches have been known to be install backwards, leading to additional errors.

U.S. Pat. No. 4,545,210 to Lord shows an electronic program control including programmable headers with fixed jumpers which develop a binary code to configure a microprocessor to the physical characteristics of an assembled refrigeration unit. The programmable header is programmed at the factory by selectively breaking the jumpers to develop the binary code. Programming of the microprocessor for accessory equipment can be performed by field service personnel using small dip switches to develop a binary code for the microprocessor. Both dip switches and the selectively broken jumpers of the programmable header are subject to considerable human error in determining the physical characteristics of the assembled refrigeration unit and the accessory equipment. Additionally, programmable headers require considerable design effort in laying out the configuration of the controller, to ensure that there exists a single location containing all of the connections to the programmable header, and all of the connections to the dip switches. Furthermore in addition to the cost and limitations of such a design effort, the cost of the programmable headers, the fixed jumpers, the connections, and the dip switches can add considerable expense to a controller.

Once the HVAC system has been initially configured, and is operating, further problems occur. In existing systems, the failure of an input such as a sensor due to a lack of a signal or to an out of range signal typically results in a system shutdown or in diminished, inaccurate operation. Essentially, previous approaches to operational failures use a fail safe approach. In a fail safe approach a predetermined default mode is used without regard to whether the component which actually failed effects the mode of operation being used. No attempt is made to determine and to continue to operate in the best available mode of operation possible without the failed component.

U.S. Pat. No. 4,598,355 to Shepler et al. shows a fault tolerant controller which includes means for detecting a fault in the controller or in an output device. The output device is controlled in a fail safe mode of operation wherein any type of failure results in a mode of operation which controls the output device as if the controller was not present in the system. A return to the normal mode of operation is caused only if the fault ceases to exist while in the fail safe mode of operation. This patent makes no attempt to continue to operate in the best available mode of operation. Additionally, the fail safe mode of operation is limited to output device failures. When the controller itself or one of its primary functions experiences a failure, a permanent fail safe flag is set ton indicate a non-recoverable type error.

U.S. Pat. No. 4,432,210 to Saito shows an air conditioning control method for setting the desired outlet air temperature in response to abnormal sensor inputs. The method selects one of a plurality of fail safe calculation formulae, the selected formulae being one which does not employ any of the abnormal sensor inputs. The mode of operation does not change. Only the outlet air temperature setting varies in response to an abnormal sensor input.

U.S. Pat. No. 4,535,598 to Mount shows a method and control system for a refrigeration system which aborts the start up of the refrigeration system if a signal provided by a sensor is not within normal limits prior to start up. Additionally, the control system shuts down the operation of the refrigeration system if the system verifies an out of bounds signal provided by the sensor during the operation of the refrigeration system. No attempt is made to continue to operate the system in any other mode of operation.

U.S. Pat. No. 4,682,279 to Watabe shows an operating mode selector which selects between cooling, shut down, and heating modes of operation by determining whether a temperature T sensed by a temperature sensor is within upper and lower preset limits. The selected operational mode is maintained as long as the sensed temperature is within the upper and lower limits. A new mode of operation is selected when the sensed temperature exceeds the preset limits of the previous mode of operation. Component failure or invalid input signals are not contemplated.

U.S. Pat. No. 4,381,549 shows a microprocessor controlled apparatus for automatically diagnosing faults in a heat pump system. As long as any one indoor temperature sensor operates properly, the system will continue to operate properly. When all temperature sensors fail, a fault condition arises. However, neither a fault condition nor the failure of individual sensors results in a change in the mode of operation.

U.S. Pat. No. 4,333,316 shows a heat pump control apparatus in which normal target temperature settings are automatically converted to an expanded operating temperature range in response to a predetermined number of invalid data signals. Again, the mode of operation is not changed.

U.S. Pat. No. 4,580,947 to Shibata et al. shows a method of controlling the operation of a plurality of compressors. The method attempts to prolong the life of the compressors by stopping the compressor which has worked the longest whenever the system load decreases, and starting a compressor other than the compressor working the longest whenever the system load is increasing.

SUMMARY OF THE INVENTION

The present invention is directed to a self-configuring HVAC system controller and includes specific embodiments directed to the defrost module, the economizer, the compressor scheduler, setpoint mode, and a sensor input line automatically configurable for use as either a single analog input or a multiplexed line input.

It is an object of the invention to solve the problems of configuring the prior art HVAC system controllers.

It is an object and an advantage of the present invention to eliminate human error in configuring HVAC system controllers.

It is an object and advantage of the present invention to provide a controller which continues to run in the most appropriate mode of operation is available.

It is an object and an advantage of the present invention to provide a system controller which will not shutdown when a necessary sensor fails, but which will reconfigure itself to maintain the best available operating mode.

It is an object and an advantage of the present invention to provide a controller which will recognize the repair or reactivation of a sensor, and reconfigure itself to the best available operating mode.

It is an object and advantage of the present invention to allow the controller of an HVAC system to reconfigure itself to run with the best available inputs in the best available operating mode.

It is an object, feature and advantage of the present invention that the economizer will continue to run in the best available mode of operation.

It is an object, feature and advantage of the present invention that the compressor scheduler will continue to run in the best available mode of operation.

It is an object, feature and advantage of the present invention to replace a disabled compressor with a compressor which is not disabled.

It is an object, feature and advantage of the present invention that the defrost module will continue to operate in the best available mode of operation.

It is an object, feature and advantage of the present invention to defrost using a first evaporator defrost mode of operation if an outside air temperature sensor is valid.

It is an object feature and advantage of the present invention that a sensor input line is automatically configurable for use as either a single analog input or a multiplexed line input.

The present invention provides a method of operating a controller of an HVAC system comprising the steps of constantly establishing the validity of each of a plurality of input devices and reconfiguring the mode of operation of the HVAC system each time the validity of any of the plurality of input devices changes to ensure that the HVAC system operates in the best available mode of operation.

The present invention provides a method of determining an evaporator defrost mode of operation for an HVAC system comprising the steps of constantly establishing the validity of an outdoor air temperature sensor and defrosting using a first evaporator defrost mode of operation if the outdoor air temperature sensor is valid.

The present invention provides a method of selecting the operating mode of an economizer comprising the steps of selecting a dry bulb economizer mode of operation if an outside air humidity sensor is not valid; selecting a reference economizer mode of operation if an outside air humidity sensor is valid, and if a return air temperature sensor or a return air humidity sensor are invalid; and selecting a comparative economizer mode of operation if the outside air humidity sensor, the return air temperature sensor, and the return air humidity sensor are valid.

The present invention provides a method of selecting operational compressors in an HVAC system for scheduling purposes comprising the steps of designating selected system compressors as primary and secondary compressors; determining which compressors, if any, are disabled based upon the status of at least one compressor cycling input; and replacing a disabled primary or secondary compressor with a system compressor which is not disabled.

The present invention provides a self configuring controller for an HVAC system including a controller; means, adapted for connection to the controller, for providing an initial HVAC system configuration; and means for reconfiguring the controller in response to a change in the status of predetermined HVAC system components.

The present invention provides an HVAC system including a compressor; a condenser connected to the outlet of the compressor; an evaporator connected to the inlet of the compressor; an expansion device connected between the evaporator and the condenser; and a controller. The controller includes means to control the compressor, the condenser, and the evaporator. The controller also includes means for initially configuring the HVAC system and means for periodically reconfiguring the HVAC system configuration based upon the validity of selected inputs so that the HVAC system runs in the best operational mode at all times.

The present invention provides a method of operating an HVAC system comprising the steps of determining a system configuration; selecting an optimal operating mode for the HVAC system; operating the system; monitoring the status of selected system components; reconfiguring the system configuration whenever the selected system components change status; and reselecting the optimal operating mode of operation for the HVAC system.

The present invention provides a method of reconfiguring the operation of an HVAC system comprising the steps of monitoring the operation of a plurality of HVAC system components; detecting a change of status of a particular system component; and reconfiguring the HVAC system to an operational mode which reflects the optimal system operation mode for the operating system components.

The present invention provides a method of operating an HVAC system using the best available setpoint comprising the steps of determining the validity of a cooling setpoint; determining the validity of a heating setpoint; automatically substituting the heating setpoint plus a first offset if the heating setpoint is valid and the cooling setpoint is invalid; and automatically substituting the cooling setpoint minus a second offset if the cooling setpoint is valid and the heating setpoint is invalid.

DETAILED DESCRIPTION OF THE DRAWINGS

Figure 1:
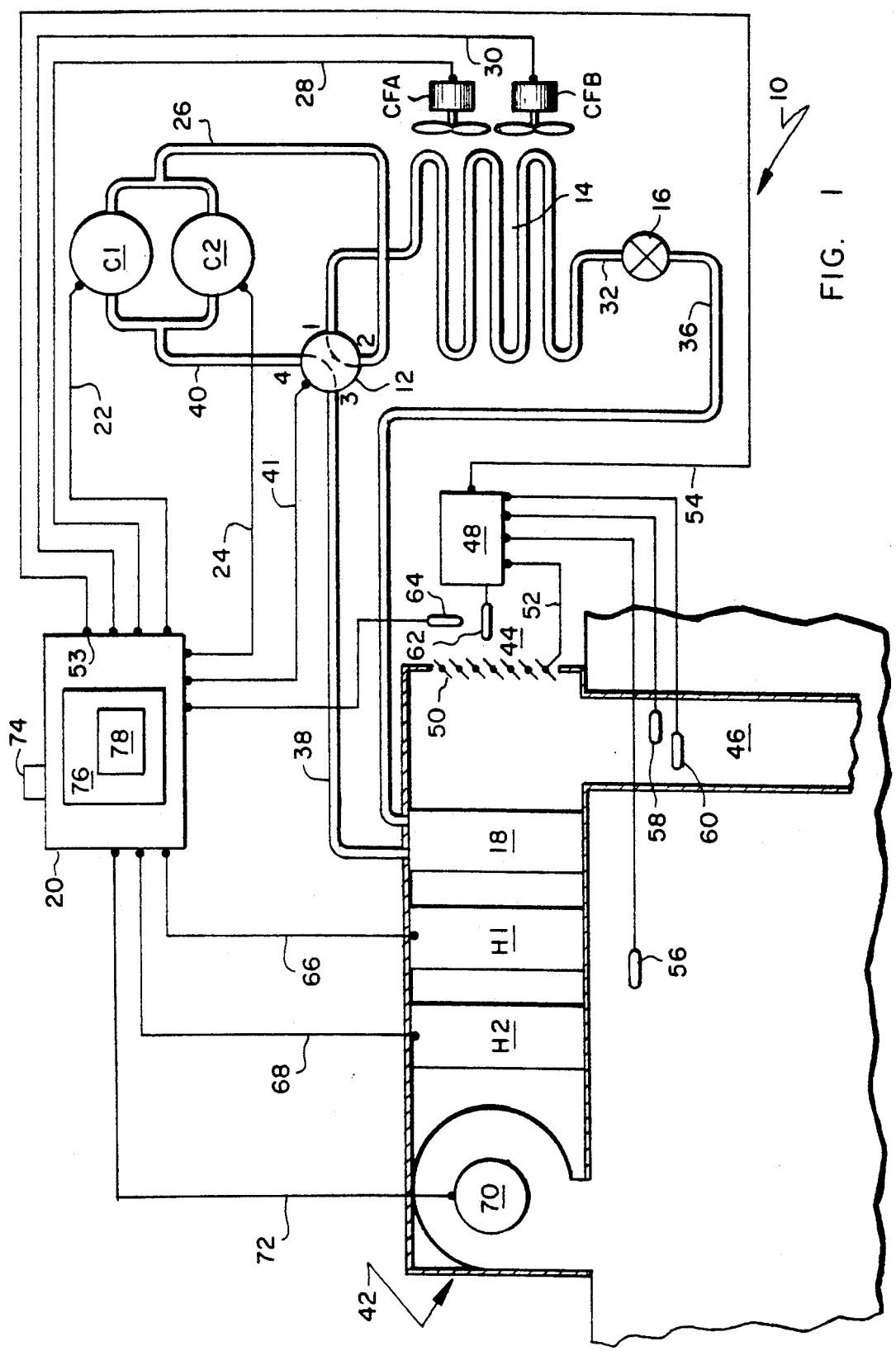
FIG. 1 shows a refrigeration system including a controller.

FIG. 1 shows an HVAC system 10 including a first compressor C1, a second compressor C2, a reversing valve 12, an outdoor heat exchanger 14, an expansion device such as an expansion valve 16, an indoor heat exchanger 18, and a system controller 20. The HVAC system, as shown in FIG. 1, is configured as a heat pump system with two compressors and two stages of auxiliary heat. However, the configuration of the actual HVAC system can vary considerably in the number of compressors and heater stages and types. Additionally, the HVAC system can be configured as a cooling only system.

In FIG. 1 the compressor C1 and C2 are connected in parallel and are selectively energized by the system controller 20 using electrical lines 22 and 24 respectively. A refrigerant line 26 leaving the compressors C1 and C2 is connected through ports 1 and 2 of the reversing valve 12 and a refrigerant line 27 to the outdoor heat exchanger 14 when the reversing valve 12 is in the cooling mode as shown in the configuration of FIG. 1. The outdoor heat exchanger 14 is cooled by two condensing fans CFA and CFB, each of which is independently connected to and controlled by the system controller 20 using electrical lines 28 and 30 respectively. A refrigerant line 32 leaving the outdoor heat exchanger 14 is connected to the expansion valve 16. The expansion valve 16 is connected to the indoor heat exchanger 18 by a refrigerant line 36. A refrigerant line 38 from the indoor heat exchanger 18 is connected through ports 3 and 4 of the reversing valve 12 to the compressors C1 and C2 by means of refrigerant line 40.

In the heating mode the system controller 20 controls the reversing valve 12 by means of an electrical line 41 so that the refrigerant line 26 leaving the compressors C1 and C2 is connected to the refrigerant line 38 and the indoor heat exchanger 18 through ports 2 and 3 of the reversing valve 12. The indoor heat exchanger 18 exchanges heat with the air passing over it, and cooled refrigerant leaves the indoor heat exchanger 18 passing along the refrigerant line 36 to the expansion valve 16. From the expansion valve 16 the refrigerant enters the outdoor heat exchanger 14 by means of the refrigerant line 32 where the refrigerant absorbs heat and vaporizes. The vaporized refrigerant returns to the compressors C1 and C2 through the refrigerant line 27, ports 1 and 4 of the reversing valve and the refrigerant line 40.

The HVAC system 10 also includes an air handling unit 42 having an outside air connection 44 and a return air connection 46. An economizer 48 mixes the outside air and the return air using a damper 50 controlled by means of an electrical line 52. The economizer 48 is connected to the system controller 20 at an input connection 53 by an electrical connection 54 and includes sensors to sense supply air temperature 56, return air temperature 58, return air humidity 60, and outside air humidity 62. Also, the system controller 20 is connected to an outside air temperature sensor 64. After the outside air and the return air has been mixed by the economizer 48, the mixed air passes over the coils of the indoor heat exchanger 18. The mixed air then passes over a first auxiliary heater H1 and a second auxiliary heater H2, each of which are connected to the system controller by an electrical line 66 and 68 respectively. Finally, a supply fan 70 impels the mixed air into the space to be cooled. The supply air fan 70 is operably connected to the controller 20 by means of an electrical line 72. The system controller 20 also includes a binary input 74 which provides an indication of whether the HVAC system 10 is configured for a heat pump or not.

Figure 2:
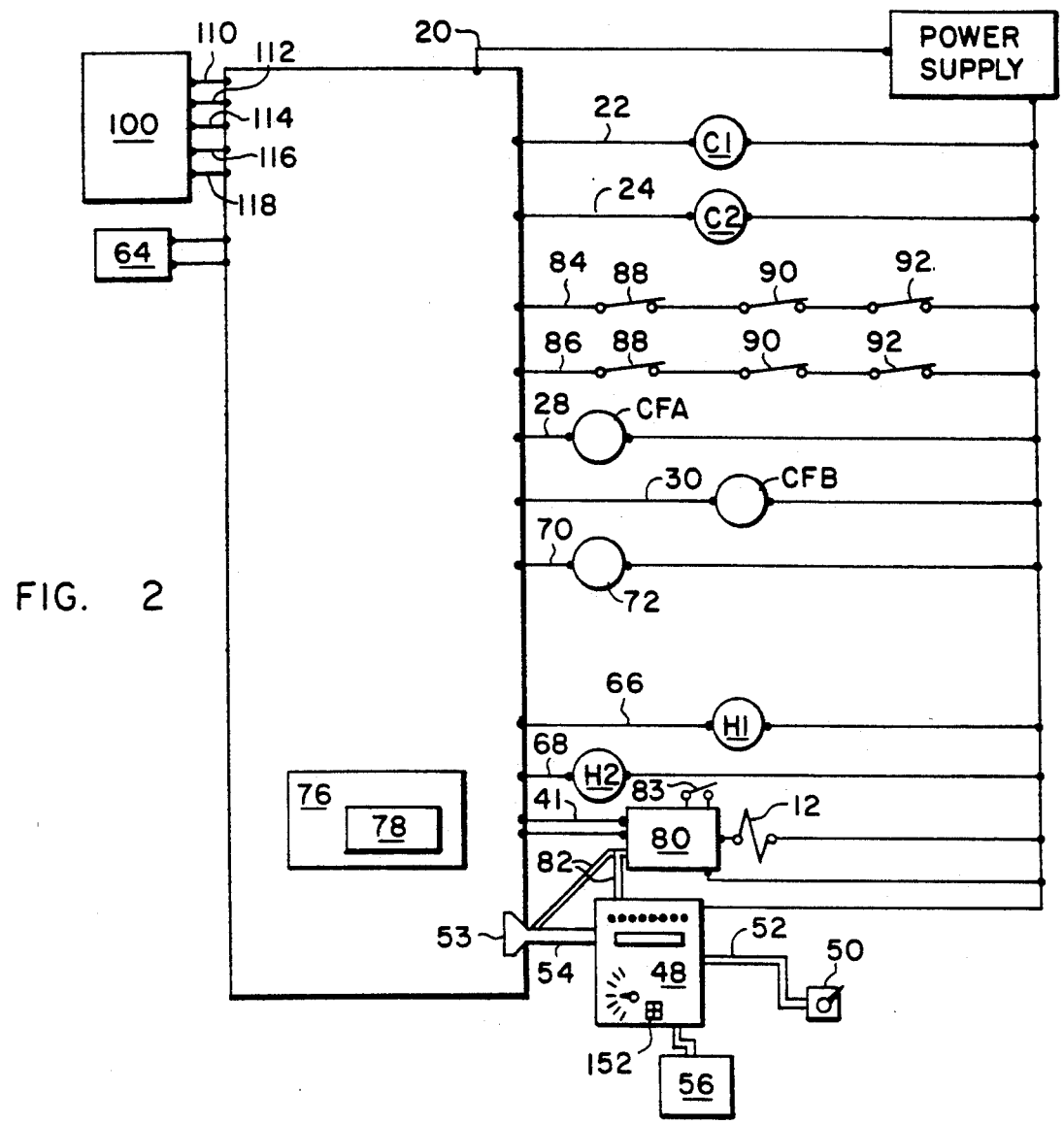
FIG. 2 shows the controller of FIG. 1 including an economizer.

The system controller 20 is shown in FIG. 2. The system controller 20 includes a circuit board 76 supporting a microprocessor 78, such as a NEC series 7800, having both read only memory (ROM) and random access memory (RAM). Although the controller 20 is shown as directly controlling its various components, an intermediate contactor is generally used.

The controller 20 includes a defrost module 80 which is connected to the economizer 48 by a connecting line 82 if the economizer 48 is included in the HVAC system 10. The defrost module is also located on the electrical line 41 between the controller 20 and the reversing valve 12 so that the defrost module 80 can control the reversing valve 12 when defrosting. If an economizer 48 is not present in the HVAC system 10, the connecting line 82 is directly connected to the controller input connection 53. The input connection 53 is a multiplexed channel which the economizer 48 uses to supply the controller 20 with information in response to requests by the controller 20. If the defrost module 80 is directly hooked to the input connection 53 by the connection line 82, the defrost module continuously transmits the state of the coil switch 83. The controller 20 uses the same software on data received at the input connection 53, but ignores all returning information except for the status of the coil switch 83 if an economizer 48 is not configured in the HVAC system 10.

The controller 20 includes a compressor cycling input line 84 for the compressor C1, and a compressor cycling input line 86 for the compressor C2. Each compressor cycling input line 84, 86 includes a series of "make break" connections which provide an indication to the controller 20 that the respective compressor C1, C2 is presently operable or inoperable. The "make break" connection can include, for example, a switch 88 indicating that the evaporator defrost module is requested, a low pressure cutout switch 90, and a building automation system input 92 indicating that the respective compressor C1, C2 is being scheduled off by a building automation system (not shown).

The system controller 20 is an intelligent device which accepts inputs, makes decisions, and issues commands to the various elements of the HVAC system 10. The controller 20 is initially configured to an initial system configuration using one of a variety of conventional methods such as, for example, programming. The inputs to the system controller 20 from a zone sensor 100 include a zone temperature input ZTEMP, a cooling setpoint CSP, a heating setpoint HSP, and a mode of operation input MODE for selecting operating modes such as, for example, EMERGENCY HEAT, HEAT, AUTO, COOL or OFF. These inputs are respectively received by the controller 20 on electrical lines 110, 112, 114 and 116 in the form of analog values which the controller 20 then uses in its decision making processes. The controller 20 also includes a common line 118.

Figure 3:
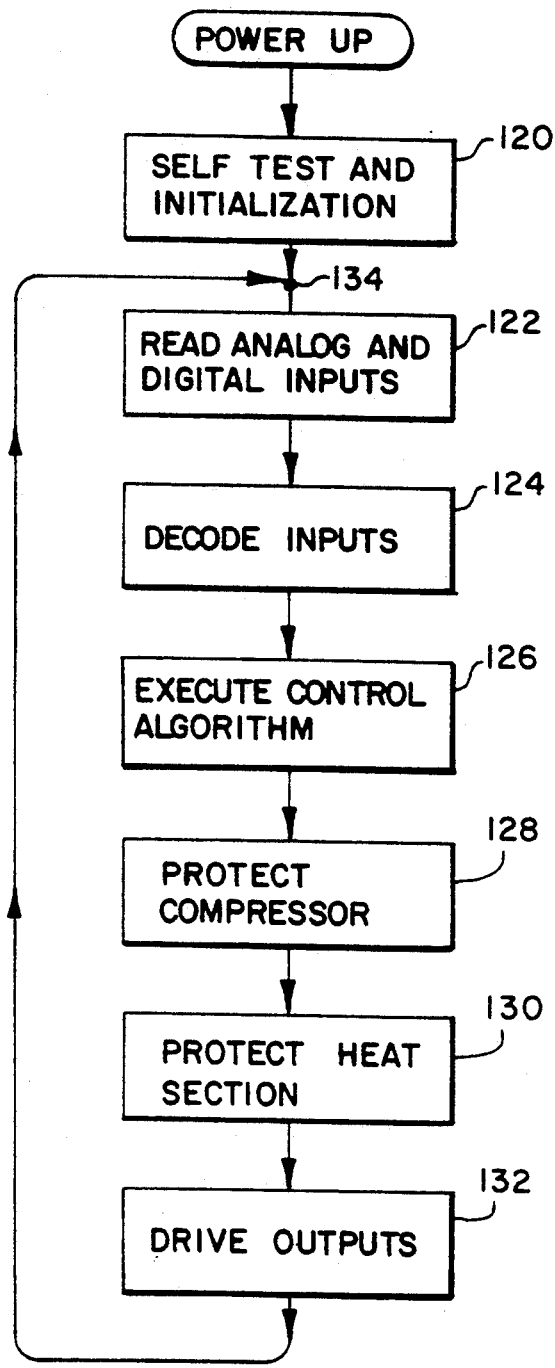
FIG. 3 is a flow chart of the general operation of the controller of FIG. 2.

FIG. 3 shows the general operation of the system controller 20. After power up, the system controller 20 performs a self test and an initialization at block 120. Next at step 122 the system controller 20 reads the analog and digital inputs including the zone sensor 100 inputs ZTEMP, CSP, HSP and MODE as well as the supply air temperature 56, the return air temperature and humidity 60, 58, and the outside air temperature and humidity 64, 62. At step 124 the controller 20 decodes the inputs received, including making a determination of the input's validity by determining if the input is within a predetermined range. In general any out of range analog input is determined to be invalid. Additionally, any analog input that has nothing connected to it is an open circuit and therefore is out of range. If an analog input comes back into its range, the input will subsequently be treated as valid.

Next at step 126 the control algorithm for the system controller 20 is executed. In this step the system controller 20 decides if heating or cooling is called for. Additionally the system controller 20 decides if the compressors C1, C2 should be scheduled on or off, and if the condenser fans CFA, CFB should be on or off. Next at step 128 the system controller 20 determines if any action should be taken to protect the compressors C1, C2. At step 130 the system controller 20 determines if the heat section should be protected. Finally at step 132 output drivers are used to implement the decisions made by the system controller 20. The system controller 20 then returns to point 134 and recommences the control loop at step 122.

Figure 4:
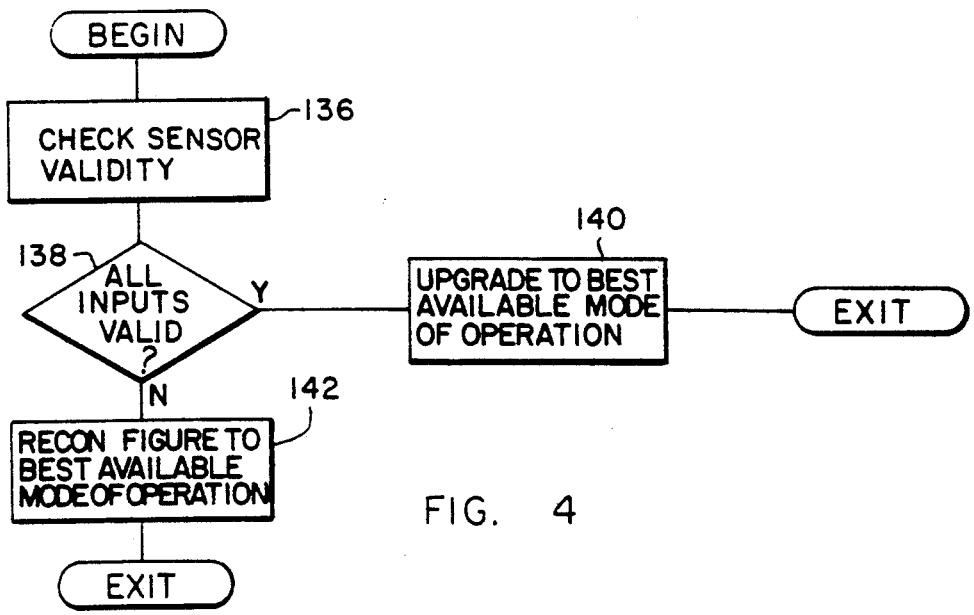
FIG. 4 is a flow chart of the present invention.

FIG. 4 shows the overall concept of the present invention. Essentially, the controller 20 monitors the validity of selected inputs and configures the mode of operation of the HVAC system 10 in response to changes in status or state of those selected inputs. Typically, the invention would be included in steps 124 and 126 in the general operation of the system controller 20 shown in FIG. 3. Initially at step 136 of FIG. 4, the sensor validity of all sensors used by the system controller 20 in controlling the HVAC system 10 is checked. A sensor is valid if the sensor is providing an input signal, and the input signal is within a predetermined range. If at step 138 all the sensor inputs are determined to be valid, the system controller 20 attempts to upgrade its mode of operation at step 140 to the best available mode of operation. Thus if a sensor had previously failed and in the interim was repaired or came back within range, the system controller 20 would automatically recognize and upgrade the mode of operation without the necessity of manual intervention. On the other hand, if at step 138 an input was determined to be invalid, the system controller 20 at step 142 reconfigures the mode of operation to the best available mode of operation that does not require the failed sensor. Examples of this are described in the following alternative and more specific embodiments.

Figure 5:
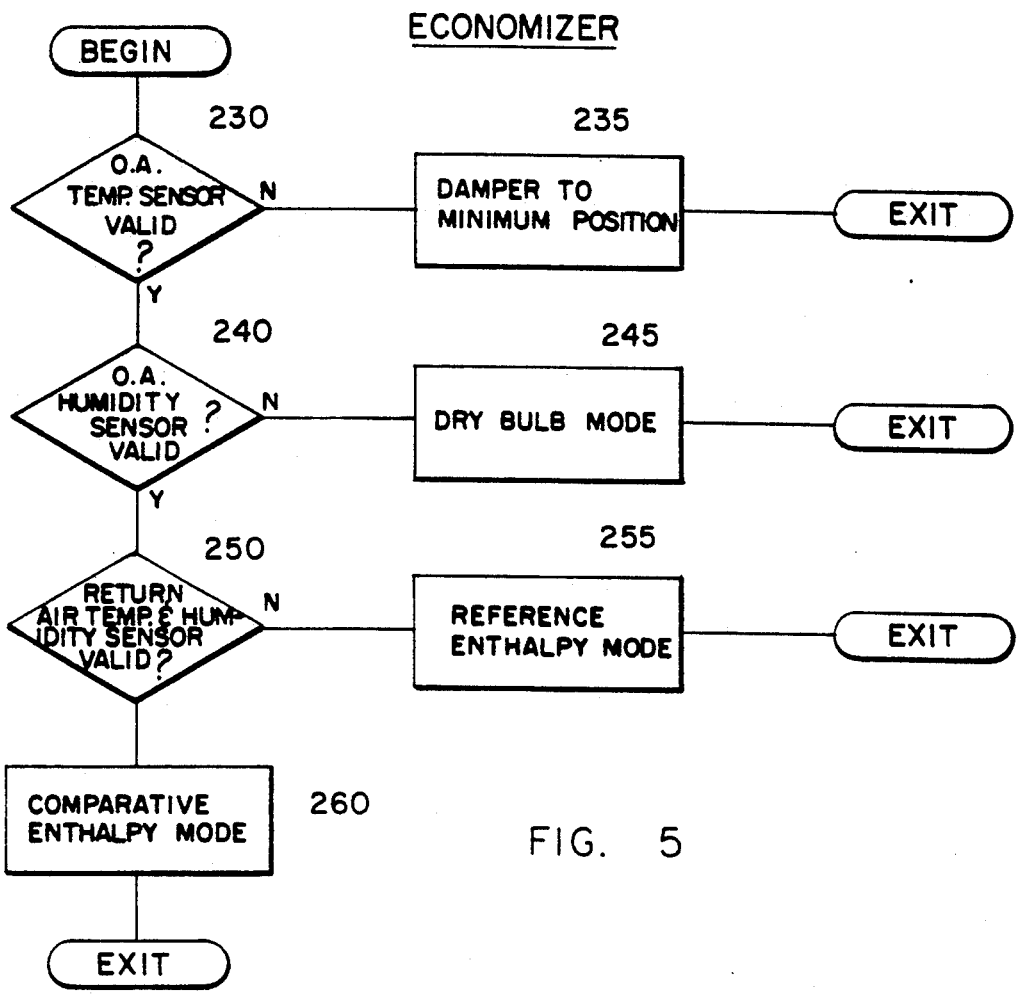
FIG. 5 is a flow chart of an economizer embodiment of the present invention.

An embodiment of the present invention is shown in FIG. 5 where the economizer mode of operation is automatically configured, and periodically reconfigured, to the best available mode of operation.

Initially at step 230, the validity of the outside air temperature sensor 64 is determined to ensure that economizing is possible. If the outside air temperature sensor 64 is invalid for either a lack of a signal or because the signal is out of range, the economizer sets the damper 50 to minimum position and exits at step 235. If the outside air temperature sensor 64 provides a valid signal, a determination is made at step 240 concerning the validity of the outside air humidity sensor 62. If the outside air humidity sensor 62 is determined to be invalid because a signal is not being provided or because the signal is out of range, then a dry bulb economizer mode of operation is selected at step 245 as the best available mode of operation. In the dry bulb mode of operation, the outside air temperature is compared to a reference temperature without regard to enthalpy, and the economizer 48 is controlled solely based upon the disparity between the outside air temperature and the reference temperature.

If the outside air humidity sensor 62 is determined to be valid in step 240, but either the return air temperature sensor 58 or the return air humidity sensor 60 are invalid at step 250, the reference enthalpy mode of operation is selected at step 255 as the best available mode of operation. In the reference enthalpy mode of operation, the outside air enthalpy is determined from the outside air temperature sensor 64 and the outside air humidity sensor 62. The outside air enthalpy is then compared to a reference enthalpy and the disparity used to control the economizer 48. In the preferred embodiment of the present invention, a reference enthalpy switch 152 is provided to allow a user to select one of four reference enthalpies to be used in comparison with the outside air enthalpy.

If at step 250 the return air temperature sensor 58 and the return air humidity sensor 60, the outside air temperature sensor 64, and the outside air humidity sensor 62 were all determined to be valid, then a comparative enthalpy mode of operation is selected at step 260 as the best available economizer mode of operation. In the comparative enthalpy economizer mode of operation, the outside air enthalpy is determined from the outside air temperature and the outside air humidity, the return air enthalpy is determined from the return air temperature and the return air humidity, and the economizer 48 is controlled based upon the disparity between the return air enthalpy and the outside air enthalpy.

An advantage of this embodiment of the present invention is that, since the HVAC system 10 periodically reconfigures itself, the economizer 48 will continue to function in the best available mode of operation after a sensor goes invalid or fails. When the failed or invalid sensor comes back on line, the HVAC system 10 will again reconfigure to the best available mode of operation. For example, if all of the sensors 58, 60, 62, and 64 are valid at system startup, the comparative enthalpy mode of operation will be selected as the best available economizer mode of operation. Should the return air humidity sensor 60 later fail, the economizer 48 will not shutdown but will automatically reconfigure the HVAC system 10 to run in the reference enthalpy mode of operation. If the outside air humidity sensor 62 subsequently fails, the HVAC system will again reconfigure to run the economizer 48 in the dry bulb mode of operation without shutting down the HVAC system 10 or requiring any operator commands. When the outside air and the return air humidity sensors 62 and 60 are repaired and come back on line, the controller 20 automatically reconfigures to run in the comparative enthalpy mode of operation without the necessity of an operator command or system restart.

Figure 6:
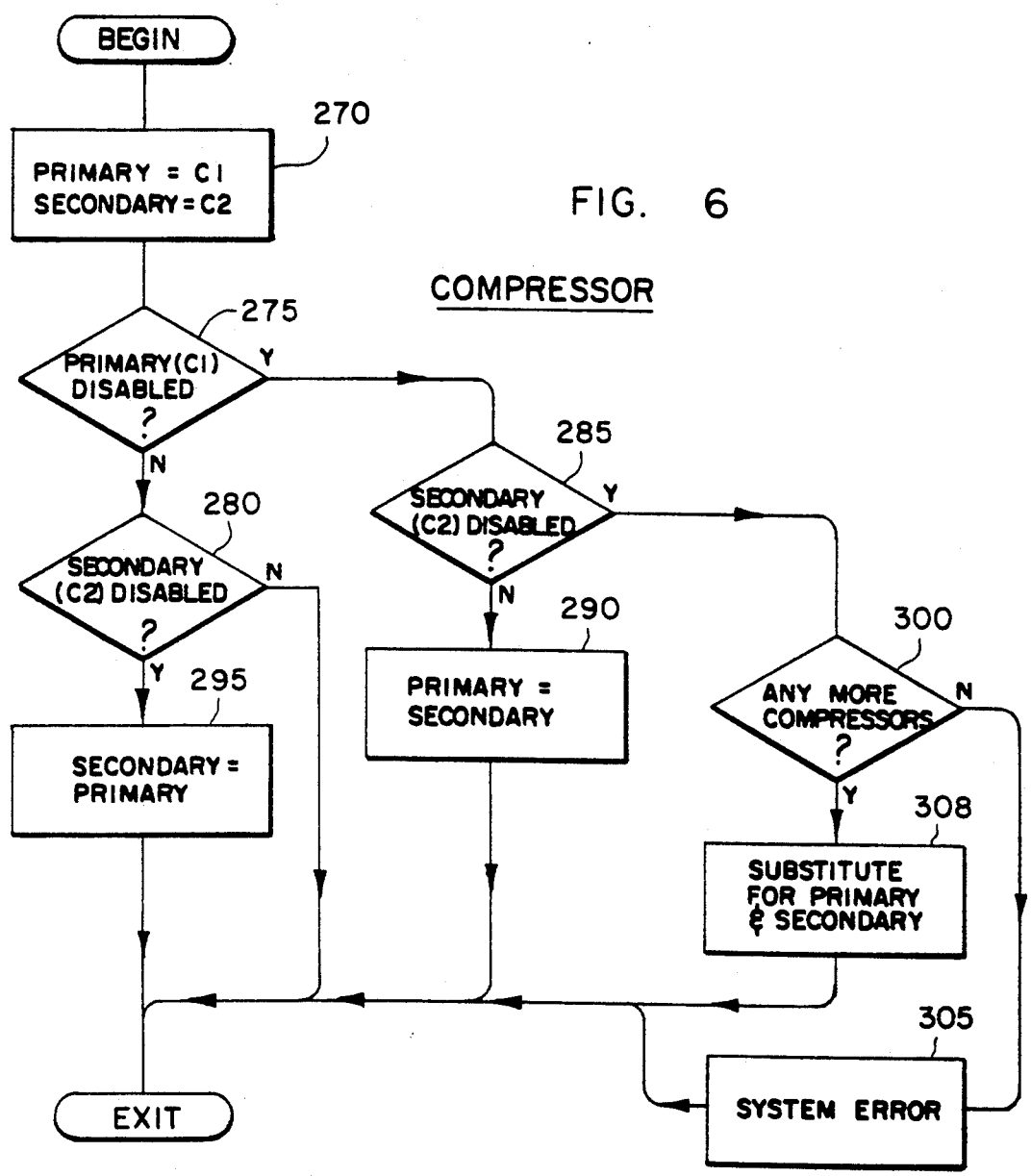
FIG. 6 is a flow chart of a compressor embodiment of the present invention.

An alternative embodiment of the present invention is shown in FIG. 6 where the compressor scheduling configuration is automatically configured, and periodically reconfigured, to the best available mode of operation.

Initially at step 270 a primary and a secondary compressor are selected in any conventional manner for compressor scheduling purposes. Next, at step 275, 280, and 285 the compressor cycling input lines 84 and 86 of each of the system compressors (C1 and C2 in the preferred embodiment of the present invention described herein) are checked to determine if either the primary or the secondary compressors are temporarily disabled. A compressor can be temporarily disabled by a building automation system (not show) for load shed purposes, by the defrost module 80 while defrosting by the low pressure cutout switch 90 if system pressure is too low, or in a number of other ways. If the primary compressor is determined to be disabled and the secondary compressor is not disabled, the secondary compressor is automatically substituted at step 290 as the primary compressor for scheduling purposes. Similarly, if the secondary compressor is disabled and the primary compressor is not disabled, the primary compressor is automatically substituted at step 295 as the secondary compressor for scheduling purposes. When a compressor is no longer disabled and returns on line, the compressor will automatically, without a system restart or operator command, be reconfigured as the primary or secondary compressor.

In an HVAC system 10 with more than two compressors, the concept is extended in conformance to the compressor scheduling scheme being used. A check for more compressors is made at step 300. If there are more compressors, active compressors are always substituted at step 308 for disabled compressors. This ensures that the system continues to run in the best available mode of operation. However, should all available compressors be disabled, a system error is generated at step 305 together with a diagnostic message indicative of the problem.

Figure 7:
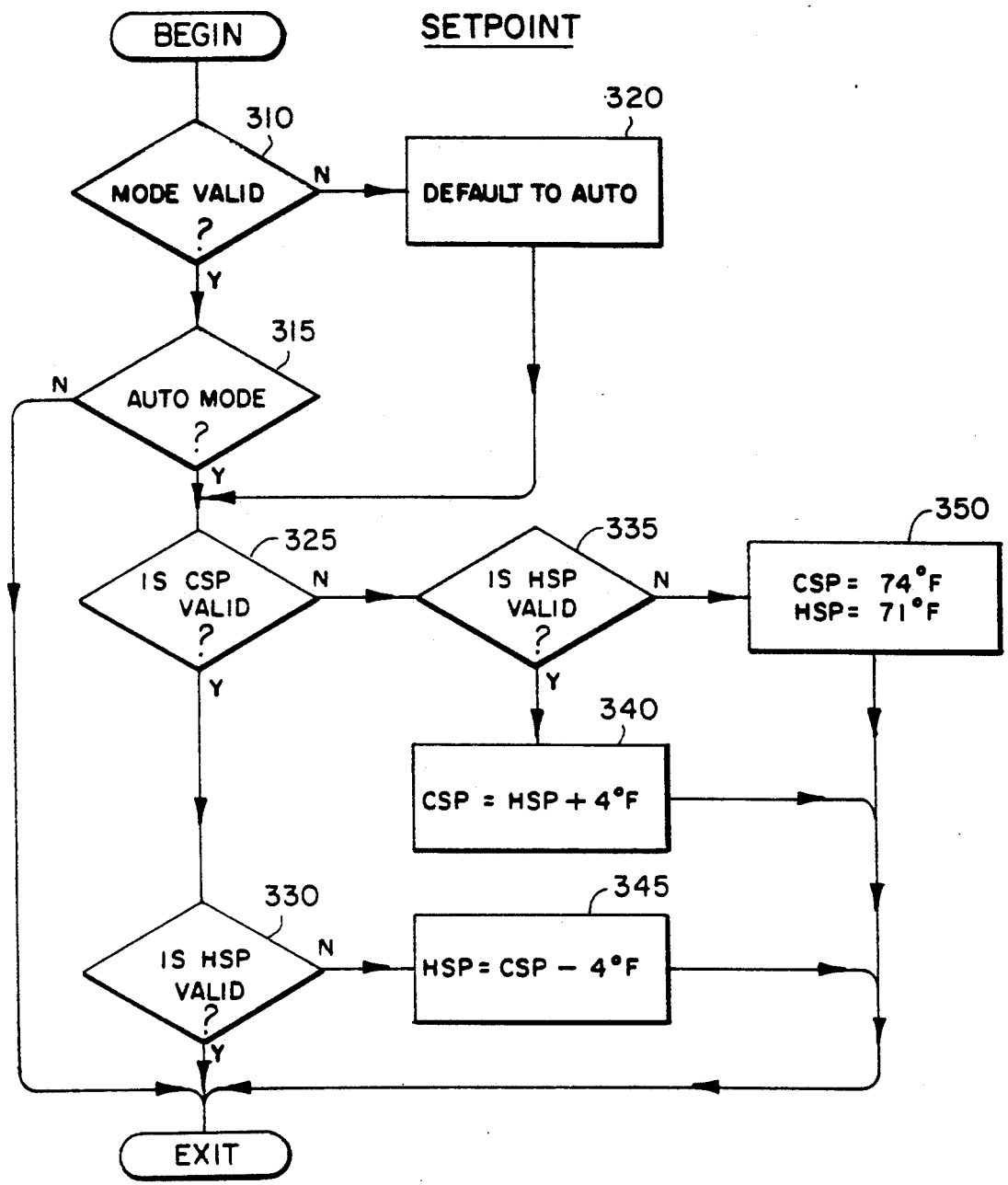
FIG. 7 is a flow chart of a setpoint embodiment of the present invention.

A further alternative embodiment of the present invention is shown in FIG. 7 where the heating and cooling setpoints are automatically configured, and reconfigured as necessary to ensure that the controller 20 and the HVAC system 10 operate in the best available mode of operation.

Initially at step 310, the validity of the signal on the mode input line 116 is determined, and a check at step 315 is made that the HVAC system 10 is in auto mode. If the mode input signal is invalid, the HVAC system 10 configures automatically to auto mode at step 320. Once the HVAC system 10 is determined to be in auto mode, the validity of the cooling setpoint and the heating setpoint are determined at steps 325, 330, and 335. If both the cooling setpoint and the heating setpoint are valid, then the HVAC system 10 uses the heating setpoint and the cooling setpoint as received on the electrical lines 112, 114. However, if either the heating setpoint or the cooling setpoint is invalid and the remaining setpoint is valid, the controller 20 automatically substitutes the valid setpoint plus a predetermined offset for the invalid setpoint. For example, in the preferred embodiment of the present invention, if in auto mode and the cooling setpoint is invalid, the cooling setpoint is calculated at step 340 as: the cooling setpoint equals the heating setpoint plus an offset of 4° F. Similarly, if the heating setpoint is invalid and the cooling setpoint is valid, the heating setpoint is calculated at step 345 as: the heating setpoint equals the cooling setpoint plus an offset of −4° F.

If both the cooling setpoint and the heating setpoint are invalid, then the cooling setpoint and the heating setpoint are replaced by first and second predetermined reference setpoints at step 350. For example, in the preferred embodiment of the present invention, the cooling setpoint is replaced by a first reference setpoint of 74° F., while the heating setpoint is replaced by a second predetermined reference setpoint of 71° F. The replacement of the invalid setpoints, and the mode reconfiguration occurs without the necessity of stopping the operation of the HVAC system 10, and without the necessity of an operator command.

Figure 8:
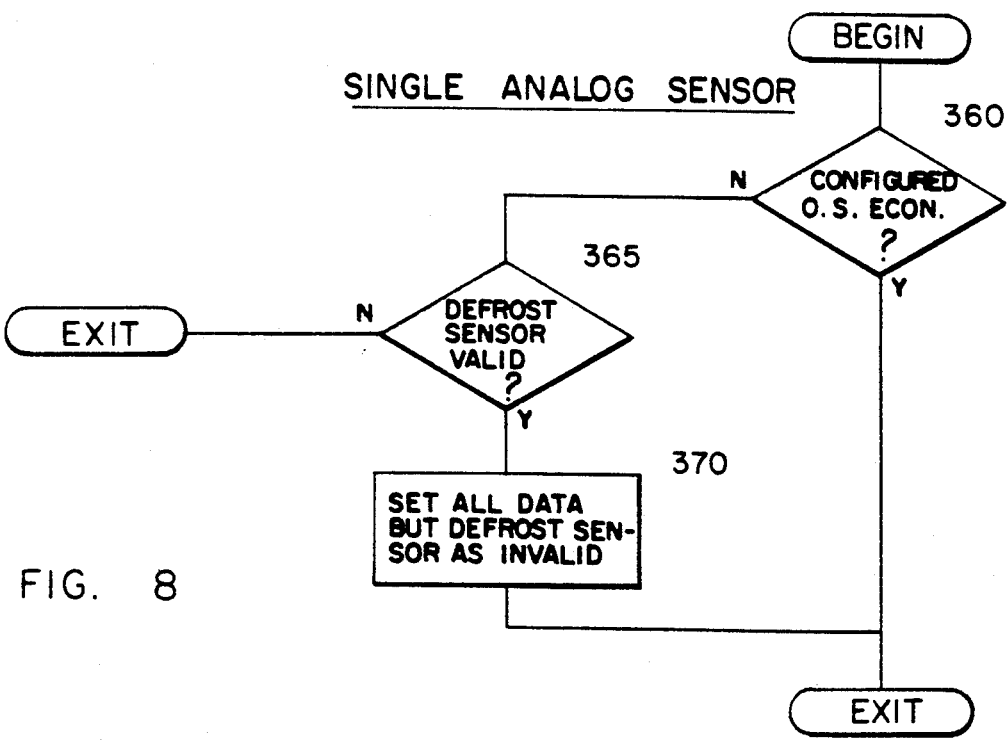
FIG. 8 is a flow chart of a multiple input embodiment of the present invention.

An alternative embodiment of the present invention shown in FIGS. 1, 2, and 8 allows either a multiplex channel, such as the economizer connection line 54, or a single analog input line, such as the defrost module line 82 to be attached to the same controller input connection 53 at the controller 20. FIG. 1 shows the economizer 48 connected to the controller 20 by a multiplexed connection line 54. The controller 20 periodically sends out various information requests on the connecting line 54 to the economizer 48 indicating what information is desired. The economizer 48 then provides a direct multiplex connection from whichever sensor supplies the desired information to the controller 20.

If the economizer 48 is not present in the HVAC system 10, one of the sensors typically connected to the economizer 48 can be directly attached to the controller input connection 53 of the controller 20. Specifically, in the preferred embodiment of the present invention, the defrost module 80 is directly attached to the controller input connection 53 of the controller 20 by means of the electrical line 82. This means that the outside air temperature defrost mode of operation can be used with or without the economizer 48, without the necessity of adding an additional input connection to the controller 20 for a coil switch 83.

Essentially, the controller 20 operates in the same manner whether the economizer 48 or the defrost module 80 is attached to the controller input connection 53. The controller 20 continually requests the status of the economizer sensors such as the outside air and return air humidity sensors 60 and 62, or the return air and the supply air temperature sensors 58 and 56. If the economizer 48 is present, the economizer 48 supplies the requested information by the multiplexed connection line 54. If the economizer is not present as determined at step 360 of FIG. 9 and if the defrost module 80 is determined to be providing a valid signal at step 365, then the defrost module 80 is determined to be attached to the controller input connection 53. The defrost module 80 continuously sends an analog value on the connecting line 82 representative of the temperature sensed by the coil switch 83. Consequently, the same signal is received by the controller 20 in response to all of the controller's requests for information. To compensate for this, at step 370 all information received from the controller input connection 53 by the controller 20 is set invalid except for the defrost information. This has the advantage that the controller 20 treats the controller input connection 53 the same way without regard to the device physically attached to the controller input connection 53. Additionally the controller 20 will automatically accept and use the economizer information if an economizer 48 is ever substituted in place of the defrost module 80, and vice verse.

Figure 9:
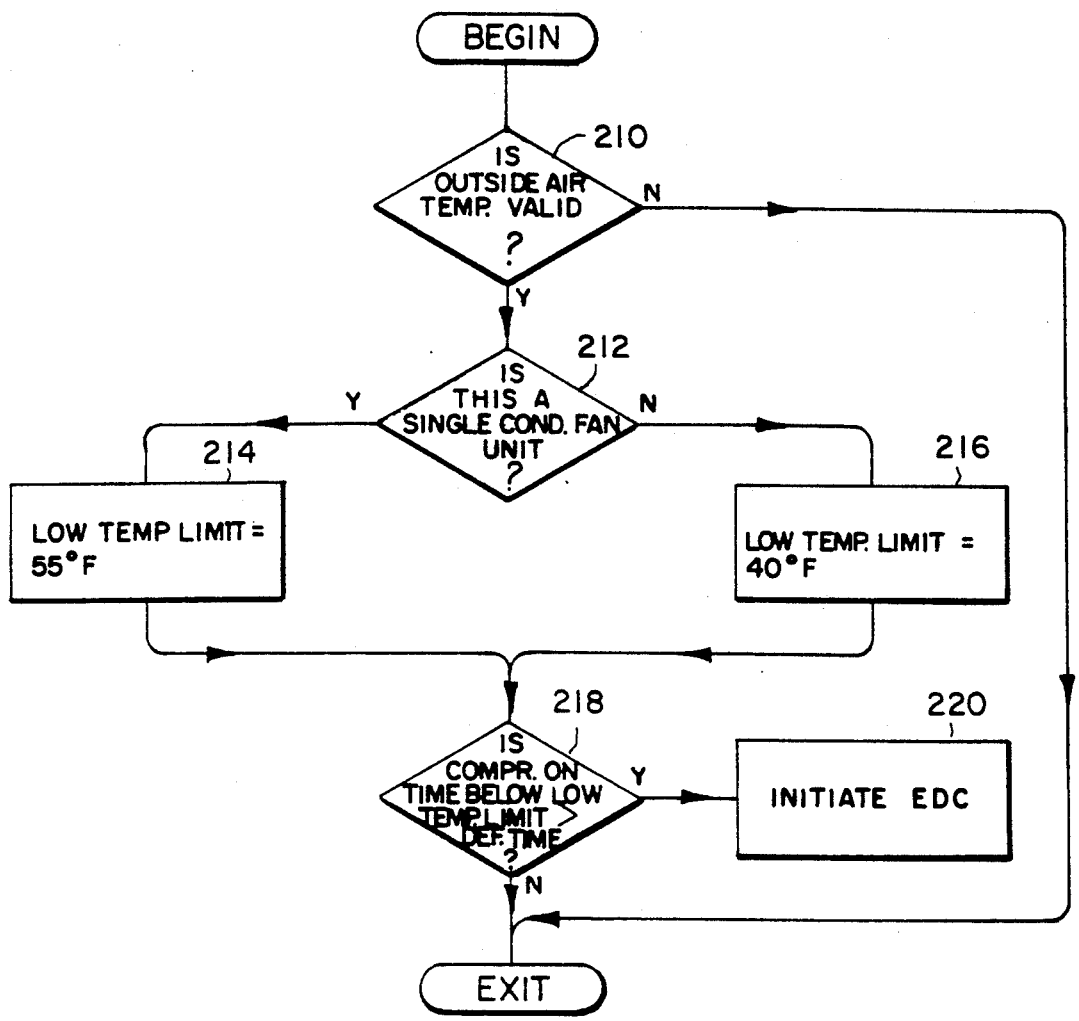
FIG. 9 is a flow chart of a defrost embodiment of the present invention.

A further embodiment of the present invention is shown in FIG. 9 where the evaporator defrost module (EDC) mode of operation is automatically configured and reconfigured based upon the validity of the outdoor air sensor 64. In previous evaporator defrost module systems, a thermostat was located on the evaporator coil as a form of compressor protection. The thermostat would turn off the compressor to prevent damage if the temperature was too low. This had the beneficial side effect that, while the compressor was off, the evaporator coil would defrost. In the present invention, the coil switch is unnecessary for evaporator defrost module because evaporator defrost module is initiated based upon outside air temperature. If the outdoor air temperature sensor 64 is valid as indicated by the sensor 64 providing a signal which is within a predetermined temperature range (step 210), an evaporator defrost mode of operation is selected which uses the outdoor air temperature as a basis for determining when to defrost. Essentially, a low temperature limit is determined for the system configuration at steps 212, 214 and 216. If the HVAC system 10 has a single condenser fan unit operating in continuous mode, then the preferred embodiment selects a low temperature limit of 55° F. at step 214. Otherwise, a low temperature limit of 40° F. is selected at step 216. These temperature limits can, of course, be varied to suit the needs of the system and the design. The compressor on-time below the selected low temperature limit is accumulated, and compared to a defrost time limit at step 218. In the preferred embodiment a ten minute defrost time limit is used, though the defrost time limit can also be varied to suit the needs of the system and the designer. If the accumulated compressor on-time exceeds the defrost time limit, an evaporator coil defrost is initiated at step 220 by turning off the compressors C1, C2 and turning the supply air fan 70 to its maximum speed. After several minutes, normal operation is resumed, and a new compressor on time accumulation begins. If the outdoor air temperature sensor 64 is invalid because a signal is not being provided or because the signal is not within the predetermined temperature range, evaporator defrost is not allowed.

This embodiment is operable when the HVAC system 10 is configured as a heat pump system and when the reversing valve 12 is in the heat pump position. If the outside air temperature sensor 64 fails, the HVAC system 64 recognizes the invalidity of the sensor 64 and ceases the evaporator defrost module mode of operation automatically without the necessity of an operator command. If the outside air temperature sensor 64 comes back on line, the HVAC system 10 recognizes the validity of the defrost sensor 64 and automatically reconfigures itself to use the evaporator defrost module mode of operator without the necessity of an operator command. Thus, the HVAC system 10 always operates in the best available evaporator defrost module mode of operation.

What has been described is a self-configuring controller which constantly establishes the validity of the inputs to the controller, and which reconfigures its mode of operation whenever the validity of an input changes. This means that the controller is always controlling the HVAC system in the best available mode of operation.

Although the present invention is described in terms of the preferred embodiments previously described, it is apparent that many alterations and modifications are possible without departing from the concept of the present invention. It is intended that all such alterations and modifications be considered within the scope and spirit of the invention as defined in the following claims.

What is claimed and desired to be secured by Letters Patent of the United States is:

1. A method of operating a controller of an HVAC system complying the steps of:
   constantly establishing the validity of each of a plurality of input devices; and
   reconfiguring the mode of operation of the HVAC system each time the validity of any of the plurality of input devices changes to ensure that the HVAC system operates in the best available mode of operation.

2. The method of claim 1 wherein the steps of establishing and reconfiguring occur automatically and without human intervention.

3. The method of claim 1 wherein the plurality of input devices includes sensors, setpoints, switches and safety devices.

4. The method of claim 1 including the further step of operating the HVAC system.

5. The method of claim 1 including the further steps of:
   establishing the validity of an outdoor air temperature sensor;
   defrosting using first evaporator defrost mode of operation if the outdoor air temperature sensor is valid; and
   defrosting using a second evaporator defrost mode of operation if the outdoor air temperature sensor is invalid.

6. The method of claim 1 including the further steps of:
   selecting a dry bulb economizer mode of operation if an outside air humidity sensor is not valid;
   selecting a reference economizer mode of operation if an outside air humidity sensor is valid, and if a return air temperature sensor or a return air humidity sensor are invalid; and
   selecting a comparative economizer mode of operation if the outside air humidity sensor, the return air temperature sensor, and the return air humidity sensor are valid.

7. The method of claim 1 including the further steps of:
   designating selected system compressors as primary and secondary compressors;

determining which compressors, if any, are disabled based upon the status of a compressor cycling input; and replacing a designated primary or secondary compressor which is disabled with a system compressor which is not disabled.

8. The method of claim 1 including the further steps of:
determining a system configuration;
selecting an optimal operating mode for the HVAC system;
operating the system;
monitoring the status of selected system components;
reconfiguring the system configuration whenever the selected system components change status; and
reselecting the optimal operating mode of operation for the HVAC system.

9. The method of claim 1 including the further steps of:
monitoring the operation of a plurality of HVAC system components;
detecting the change of status of a particular system component; and
reconfiguring the HVAC system to an operational mode which reflects the optimal system operation mode for the operating system components.

10. The method of claim 1 including the further steps of:
determining the validity of a cooling setpoint;
determining the validity of a heating setpoint;
automatically substituting the heating setpoint plus a first offset if the heating setpoint is valid and the cooling setpoint is invalid;
automatically substituting the cooling setpoint minus a second offset if the cooling setpoint is valid and the heating setpoint is invalid.

11. A method of determining an evaporator defrost mode of operation for an HVAC system comprising the steps of:
constantly establishing the validity of an outdoor air temperature sensor;
determining a first evaporator defrost mode of operation if the outdoor air temperature sensor is valid;
determining a second evaporator defrost mode of operation if the outdoor air temperature sensor is invalid; and
defrosting using a st evaporator defrost mode of operation if the outdoor temperature sensor is valid;
defrosting using the second evaporator defrost mode of operation if the outdoor air temperature sensor is invalid.

12. The method of claim 11 including the further step of using a first evaporator defrost low temperature limit if the HVAC system includes a single condenser fan unit, and a second evaporator defrost low temperature limit if the HVAC system includes more than one condenser fan unit.

13. The method of claim 12 wherein the first low temperature limit is approximately 55° F. and the second low temperature limit is approximately 40° F.

14. A method of selecting the operating mode of an economizer comprising the steps of:
selecting a dry bulb economizer mode of operation if an outside air humidity sensor is not valid;
selecting a reference economizer mode of operation if an outside air humidity sensor is valid, and if a return air temperature sensor or a return air humidity sensor are invalid; and selecting a comparative economizer mode of operation if the outside air humidity sensor, the return air temperature sensor, and the return air humidity sensor are valid.

15. The method of claim 14 including the further step of periodically determining the validity of the outside air humidity sensor, the return air humidity sensor, and the return air temperature sensor.

16. The method of claim 15 including the further step of determining the validity of an outside air temperature sensor.

17. A method of selecting operational compressors in an HVAC system for scheduling purposes comprising the steps of:
designating selected system compressors as primary and secondary compressors;
determining whether a compressor cycling line respectively associated with each selected system compressor is providing a valid input;
determining which compressors, if any, are disabled based upon the validity of the respective compressor cycling input; and
replacing a disabled primary or secondary compressor with a system compressor which is not disabled.

18. A self configuring controller for an HVAC system comprising:
a controller;
means, adapted for connection to said controller, for providing an initial HVAC system configuration;
means, operatively associated with the controller, for determining the validity of predetermined HVAC system components; and
means, operatively associated with the controller, for reconfiguring the controller in response to a change in the validity of the predetermined HVAC system components.

19. The controller of claim 18 further including means to periodically check the validity of particular controller's inputs, and means to reconfigure the system configuration based upon the validity of the particular controller inputs.

20. An HVAC system comprising:
a compressor;
a condenser connected to the outlet of the compressor;
an evaporator connected to the inlet of the compressor;
an expansion device connected between the evaporator and the condenser; and
a controller including means to control the compressor, the condenser, and the evaporator;
means for initially configuring the HVAC system; and
means for periodically reconfiguring the HVAC system configuration based upon the validity of selected inputs so that the HVAC system runs in the best operational mode at all times.

21. A method of operating an HVAC system comprising the steps of:
determining a system configuration;
selecting an initial operating mode for the HVAC system;
operating the system;
monitoring the validity of selected system components;
reconfiguring the system configuration whenever the selected system components change validity; and reselecting the optimal operating mode of operation for the HVAC system.

22. A method of reconfiguring the operation of an HVAC system comprising the steps of:

monitoring the operation of a plurality of HVAC system components;

determining the validity of input signals received from each of the plurality of HVAC system components; p1 detecting a change of validity for a particular system component; and reconfiguring the HVAC system to an operational mode which reflects the optimal system operation mode for the operating system components.

23. The method of claim 22 where the reconfiguring of the system occurs during operation of the HVAC system.

24. A method of using the best available setpoint to operate an HVAC system comprising the steps of:

determining a desired mode of operation for the HVAC system;

determining the validity of a cooling setpoint;

determining the validity of a heating setpoint;

operating the HVAC system using the cooling setpoint if the cooling setpoint is valid and the desired mode of operation is cooling;

operating the HVAC system using the heating setpoint if the heating setpoint is valid and the desired mode of operation is heating;

automatically substituting the heating setpoint plus a first offset for the cooling setpoint if the desired mode of operation is cooling and the heating setpoint is valid and the cooling setpoint is invalid; and automatically substituting the cooling setpoint minus a second offset for the heating setpoint if the desired mode of operation is heating and the cooling setpoint is valid and the heating setpoint is invalid.

25. The method of claim 24 including the further step of automatically substituting a first and a second reference setpoint, respectively, for the heating setpoint and the cooling setpoint if both the heating setpoint and the cooling setpoint are invalid.

26. The method of claim 25 wherein the first and second reference setpoints, and the first and second offsets are predetermined.

27. The method of claim 26 where the first offset is approximately 4° F., the second offset is approximately 4° F., the first reference setpoint is approximately 71° F., and the second reference setpoint is approximately 74° F.

28. The method of claim 27 including the further step of initially establishing an auto mode of operation for the HVAC system.

29. The method of claim 28 including the further step of reconfiguring the HVAC system to an auto mode of operation if a mode input signal is invalid.

30. A self configuring controller for an HVAC system comprising:

a controller having a plurality of modes of operation including a first mode of operation, a second mode of operation, and a default mode of operation;

the controller having a plurality of inputs where the inputs are either within a predetermined range (valid) or outside of a predetermined range (invalid);

the controller including means, operatively associated with the plurality of inputs, for continuously determining the validity of the plurality of inputs and for providing a signal each time a particular input experiences a change in validity;

means, responsive to the validity determining means, for determining an optimum mode of operation from the plurality of modes of operation each time an input experiences a change in validity, the optimum mode determining means further including means for initiating the default mode of operation only if no other mode of operation can be sustained; and means, responsive to the optimum mode determining means, for configuring the controller to operate in the optimum mode of operation.

31. The self configuring controller of claim 30 wherein the optimum mode determining means further includes means for automatically upgrading the mode of operation from the default mode of operation to the first or second mode of operation.

* * * * *

UNITED STATES PATENT AND TRADEMARK OFFICE
CERTIFICATE OF CORRECTION

PATENT NO. : 5,276,630

DATED : January 4, 1994

INVENTOR(S) : Joe M. Baldwin, Richard A. Bishop, William G. Hansen and Phillip L. Polley It is certified that error appears in the above-identified patent and that said Letters Patent is hereby corrected as shown below:

On the title page:

Item [75] after "Phillip L. Polley" add --David M. Foye, La Cross, WI--.

Column 2, Line 31, "ton" should read -- to --.

Claim 11, Column 13, Line 47, "delete [a st] and substitute -- the first --.

Claim 22, Column 15, Line 9, delete [p1] and start a new paragraph beginning with the word "detecting".

Signed and Sealed this

Tenth Day of May, 1994

Attest:

BRUCE LEHMAN

*Attesting Officer*          *Commissioner of Patents and Trademarks*